US 6,600,477 B1

(12) United States Patent
Howell (10) Patent No.: US 6,600,477 B1
(45) Date of Patent: *Jul. 29, 2003

(54) METHOD FOR INPUTTING DATA VIA THE FOOT (75) Inventor: Matthew G. Howell, Nampa, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/561,065

(22) Filed: Apr. 28, 2000

Related U.S. Application Data (63) Continuation of application No. 08/992,639, filed on Dec. 17, 1997, now Pat. No. 6,091,402.

(51) Int. Cl.⁷ .............................. G09G 5/08; G09G 5/00
(52) U.S. Cl. ....................... 345/157; 345/156; 345/163; 345/167; 345/173
(58) Field of Search .................. 345/156, 157, 345/158, 163, 165, 166, 168, 173, 174, 175

(56) References Cited

U.S. PATENT DOCUMENTS

| 3,834,702 | A | * | 9/1974 | Bliss ........................... 273/86 |
| 4,488,017 | A | * | 12/1984 | Lee ............................... 200/5 |
| 4,720,789 | A | * | 1/1988 | Hector et al. ............... 364/410 |
| 5,139,261 | A | * | 8/1992 | Openiano ................... 273/148 |
| 5,229,756 | A | | 7/1993 | Kosugi et al. |
| 5,334,997 | A | * | 8/1994 | Scallon ........................ 345/167 |
| 5,552,807 | A | * | 9/1996 | Hayes et al. ................. 345/156 |
| 5,635,957 | A | * | 6/1997 | Feierbach et al. ........... 345/163 |
| 5,745,055 | A | * | 4/1998 | Redlich et al. ................ 341/20 |
| 5,812,114 | A | | 9/1998 | Loop |
| 5,838,305 | A | * | 11/1998 | Bookstein .................... 345/163 |
| 5,864,333 | A | * | 1/1999 | O'Heir ........................ 345/157 |
| 5,889,510 | A | * | 3/1999 | Klarlund ...................... 345/168 |
| 5,907,318 | A | * | 5/1999 | Medina ........................ 345/163 |
| 5,913,727 | A | * | 6/1999 | Ahdoot ......................... 463/39 |
| 5,943,044 | A | * | 8/1999 | Marinelli et al. ............ 345/174 |
| 6,091,402 | A | * | 7/2000 | Howell ......................... 345/157 |

FOREIGN PATENT DOCUMENTS

| GB | 2038597 | 7/1980 |
| JP | 404077913 A | 3/1992 |
| JP | 404242818 A | 3/1992 |

* cited by examiner

Primary Examiner—Steven Saras
Assistant Examiner—Alecia D. Nelson
(74) Attorney, Agent, or Firm—Knobbe, Martens, Olson & Bear, LLP (57) ABSTRACT One embodiment of the present invention comprises a method for inputting information into an electronic device comprising the acts of orienting a sensing pad relative to an electronic device operator, sensing the relative location of a foot motion indicator controlled by the operator and translating the relative location of the foot motion indicator into electronic information. The method may further comprise displaying the electronic information on a screen. The act of sensing may be capacitive sensing, resistive sensing or optical sensing.

30 Claims, 9 Drawing Sheets

METHOD FOR INPUTTING DATA VIA THE FOOT

This application is a continuation of Ser. No. 08/992,639 U.S. Pat. No. 6,091,402, filed Dec. 17, 1997.

BACKGROUND OF THE INVENTION

1. Field of the Invention

This invention relates generally to methods for inputting data or other information. More particularly, this invention relates to methods for inputting data or other information into electronic devices by computer operator foot motion. Specifically, this invention relates to foot operated computer input methods.

2. Description of the Prior Art

In the computer industry, the keyboard is the primary input device used by computer operators to manually input data or other information into a computer system. In many cases, however, a computer operator may find it relatively more convenient, efficient or even necessary to use a second manual input device, such as a "mouse" or a trackball, that operates as a pointer or positioner and as a selector (hereinafter referred to as a "manual pointing device"). Generally, manual pointing devices translate some movement of a computer operator's hand or fingers into data or other information that is input into the computer. The computer in turn translates this data or other information into the movement, positioning or selection of an object, item or icon on the computer screen (hereinafter referred to as "screen items"). For example, a manual pointing device may allow the computer operator to position the computer screen's cursor in specific locations or "sweep" an area on the computer screen more quickly and more accurately than a keyboard. Alternatively, a manual pointing device may allow the computer operator to quickly point to and select specific computer screen items.

There are, however, limitations to using manual pointing devices. For example, when using a manual pointing device the computer operator will usually remove at least one hand from the keyboard. Additionally, the computer operator may divert his or her gaze or attention from the keyboard or the computer screen when reaching for the manual pointing device. In most cases, these actions will force the computer operator to stop inputting data or other information into the computer via the keyboard. Thus, the use of a manual pointing device may decrease the rate at which data or other information is input into the computer. Additionally, some handicapped individuals may find it difficult or impossible to operate a manual pointing device. Finally, for some computer applications, particularly computer games, a computer operator may find it relatively more intuitive, efficient, or even necessary to use a non-manual pointing device to input data or other information into a computer.

Several types of foot operated input devices have been employed in the art. U.S. Pat. Nos. 5,177,473 and 5,552,807 both disclose foot operated electronic input devices. However, neither of the devices disclosed in these patents may operate as a pointing device, and therefore may be of limited use in most graphics sensing pad support assembly computer applications. Moreover, the components of these devices that translate the movement of the computer operator's foot into data or other information for the computer (the "translational components") are comprised of moving mechanical parts. Thus, the devices are subject to a relatively greater rate of mechanical malfunction than a device utilizing non-moving or passive translational components. These limitations may make these devices relatively expensive to operate.

The device disclosed in U.S. Pat. No. 5,334,997 (the "Scallon device") comprises a foot operated pointing device utilizing a trackball. While the Scallon device may be used as a pointer, the translational components of the Scallon device are also comprised of moving mechanical parts and subject to the same limitations described above. Additionally, the Scallon device may require the computer operator to perform relatively complex movements of his or her foot to frictionally engage and rotate the trackball. Again, these limitations may make the Scallon device or other similar devices relatively disadvantageous.

Thus there exists a need for foot operated input device, wherein the translational components of the device are not comprised of moving mechanical parts. Additionally, there exists a need for a foot operated input device that may operate as a pointer and as a selector. Furthermore, there exists a need for a foot operated input device that does not require relatively complex interaction between the computer operator's foot and the translational components of the device.

SUMMARY OF THE INVENTION

One embodiment of the present invention comprises a method for inputting information into an electronic device comprising the acts of orienting a sensing pad relative to an electronic device operator, sensing the relative location of a foot motion indicator controlled by the operator and translating the relative location of the foot motion indicator into electronic information. The method may further comprise displaying the electronic information on a screen. The act of sensing may be capacitive sensing, resistive sensing or optical sensing.

DETAILED DESCRIPTION

First Embodiment

Figure 1:
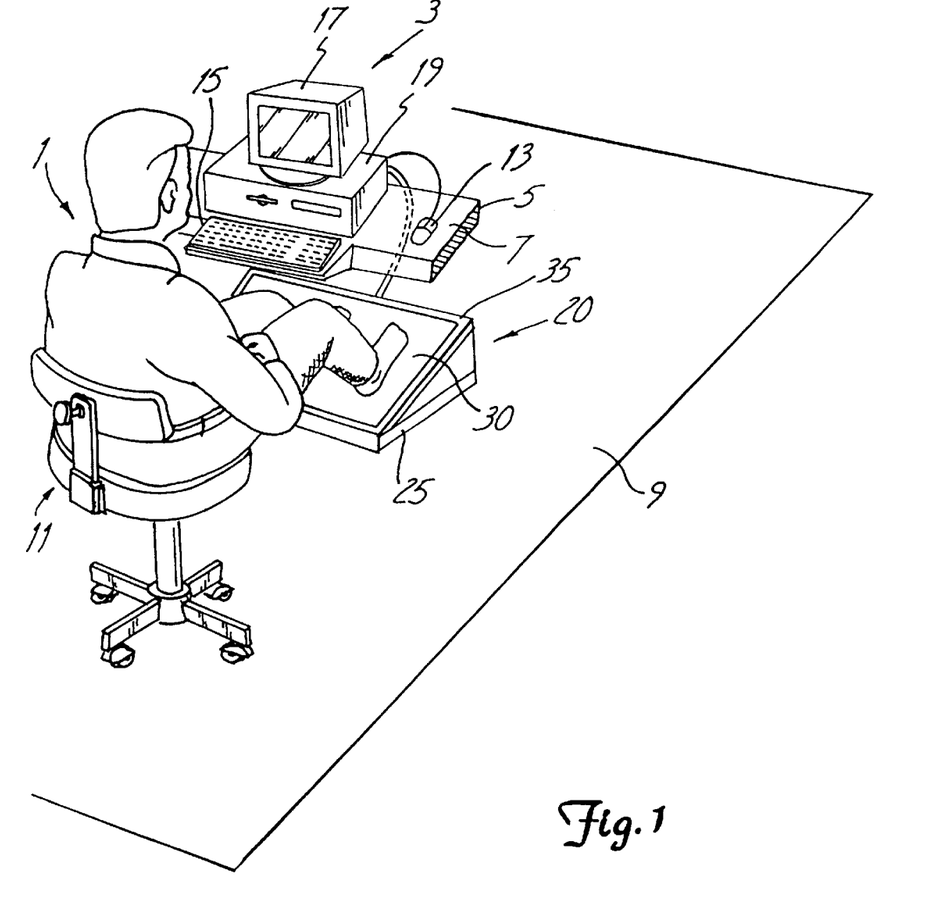
FIG. 1 is a perspective view of a computer operator using one embodiment of present invention to input data and other information into a computer system.

FIG. 1 illustrates the present invention in a typical computer system operating environment. In FIG. 1, a computer operator 1 is operating a computer system 3. Generally, the computer system 3 comprises a computer monitor or screen 17, a digital computer 19, a keyboard 15, a mouse 13 and a foot operated input device 20. In this environment, the computer screen 17, digital computer 19, keyboard 15 and mouse 13 are supported by a table or desk 5 having an upper horizontal surface or desk top 7. The desk top 7 is at an elevation above the floor 9 such that the computer operator 1 may position his or her legs and feet under the desk top 7 when the computer operator 1 is sitting in a chair 11.

The foot operated input device 20 may be placed on the floor 9 underneath the desk top 7 in a position such that the computer operator 1 may operate the foot operated input device 20. The computer operator 1 may operate the foot operated input device 20 by moving or positioning at least one of his or her feet, or other foot motion indicator, in proximity to, or in contact with, the foot operated input device 20. Hereinafter, a foot motion indicator shall mean, without limitation, a computer operator's foot, a computer operator's footwear (including, without limitation, socks and shoes designed or not designed to be used with the present invention) and any other tangible item that may be controlled, positioned, moved or guided by the computer operator's foot when the computer operator 1 is operating the foot operated input device 20.

Figure 2:
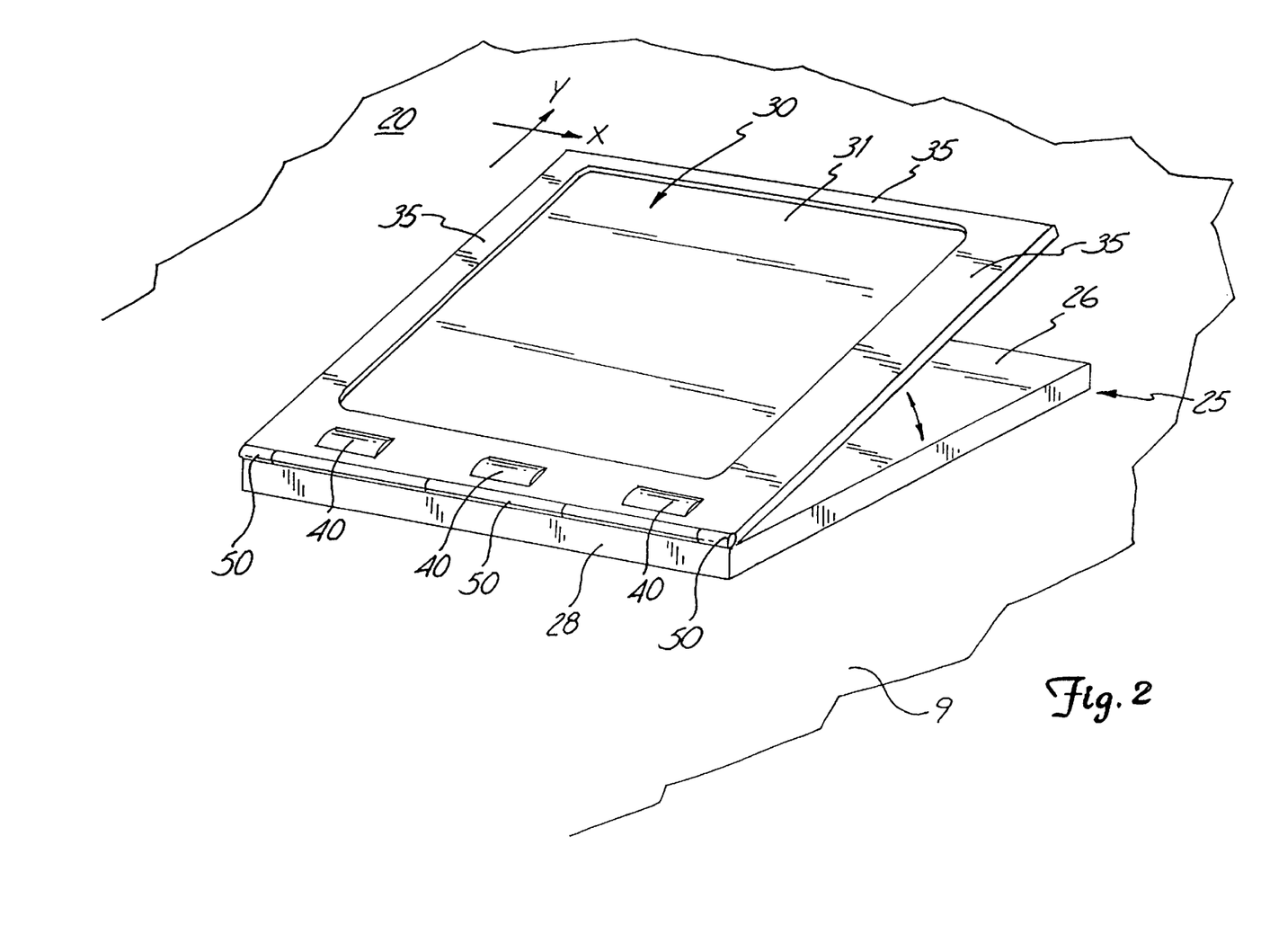
FIG. 2 is a perspective view of one embodiment of the present invention.
Figure 3:
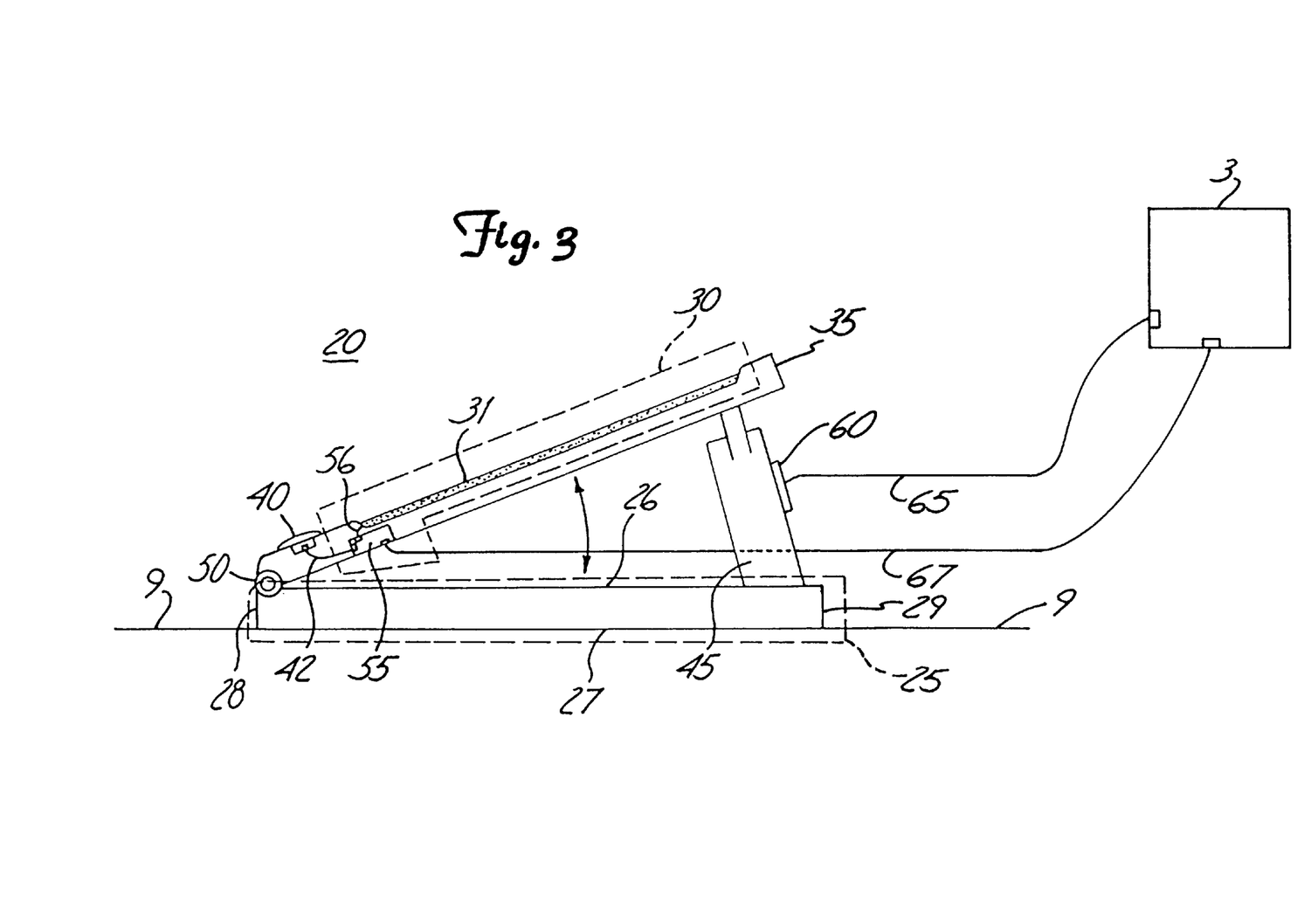
FIG. 3 is a side view of the embodiment of the present invention shown in FIG. 2.

Referring now to FIGS. 2 and 3, there is shown an embodiment of the present invention oriented in an X-Y plane. (In general, the present invention may be said to be associated with the X-Y plane in which it is oriented). In FIGS. 2 and 3, a foot operated input device 20 is shown generally comprising a sensing pad support assembly 25, a substantially planar sensing pad housing 35, a substantially planar sensing pad 30 and an angle adjusting assembly 45. The dimensions of the sensing pad support assembly 25, the sensing pad housing 35 and the sensing pad 30 may be selected in accordance with the desired application or operating environment of the foot operated input device 20. In the embodiment shown in FIGS. 2 and 3, the exposed area of the sensing pad 30 (i.e., the area of the sensing pad 30 that may be contacted by the computer operator 1) may be approximately 28 inches wide (measured in the X direction of the X-Y plane) and 20 inches long (measured in the Y direction of the X-Y plane). In this embodiment, the dimensions of the sensing pad support assembly 25 and the sensing pad housing 35 may be nominally larger than the dimensions of the exposed area of the sensing pad 30.

The sensing pad support assembly 25 of the foot operated input device 20 is comprised of an upper surface section 26, a lower surface section 27, a front section 28 and a rear section 29. In FIGS. 2 and 3, the sensing pad support assembly 25 is shown as substantially rectangular in shape, however, the sensing pad support assembly 25 may be formed in various other shapes, including substantially circular or triangular shapes.

In the embodiment shown in FIGS. 2 and 3 the sensing pad support assembly 25 for the foot operated device 20 is oriented such that the lower surface section 27 of the sensing pad support assembly 25 is substantially in contact with the floor 9. (The sensing pad support assembly 25 may, however, be positioned in a variety of orientations; i.e., the lower surface section 27 of the sensing pad support assembly 25 may be mounted or attached to a wall or a substantially vertical section of the desk 5). In this manner, the sensing pad support assembly 25 may stably maintain the foot operated device 20 in a particular position relative to the computer operator 1 as the computer operator 1 operates the foot operated input device 20.

The sensing pad housing 35 may be operably connected to the sensing pad support assembly 25 by a conventional pivot assembly 50. As shown in FIGS. 2 and 3, the sensing pad support assembly 25 and sensing pad housing 35 may be pivotally connected generally toward the front section 28 of the sensing pad support assembly 25. A wide variety of conventional pivot assemblies, such as hinge assemblies, may be used to operably connect the sensing pad housing 35 and the sensing pad support assembly 25. The components of the pivot assembly 50 may be integrally attached to both the sensing pad support assembly 25 and the sensing pad housing 35. As best shown in FIG. 3, the pivot assembly 50 allows the sensing pad 30 and the sensing pad housing 35 to be variably oriented at a plurality of angles relative to the sensing pad support assembly 25 (and relative to the Y axis).

At least partially secured within the sensing pad housing 35 is a substantially planar electronic or optical sensing pad 30. The sensing pad 30 comprises the translational components of the present invention. The sensing pad 30 may be comprised of sensing circuitry 31 and sensing pad control circuitry 55. The sensing pad 30 is secured within the sensing pad housing 35 such that the sensing circuitry 31 is relatively exposed to the computer operator 1 and the computer operator 1 may contact the sensing circuitry 31 with a foot motion indicator. The sensing pad 30 may be an appropriately dimension version of any of a variety of conventional proximity or touch sensitive pads that employ capacitance-based, resistance-based or optical-based sensing technologies, such as Cirque's Glidepoint® sensing pad, Arn Technologies' Super Elite® sensing pad or Silitek's Touchpad® sensing pad. While normally substantially planar, in view of the greater size of such a sensing pad 30 relative to conventional mouse pads and in view of the greater range of motion of a computer operator's feet relative to his or her hands, it may be advantageous to make the surface of sensing pad 30 either somewhat concave or somewhat convex (relative to the operator) to provide the computer operator 1 with additional kinesthetic clues about the position of a foot motion indicator under his or her control.

The sensing pad circuitry 31 may be designed to sense or detect movements or the location or position of a foot motion indicator relative to the sensing pad 30. The sensing pad circuitry 31 may also be designed to sense or detect the relative pressure exerted by a foot motion indicator upon the sensing pad circuitry 31. The sensing circuitry 31 may be operably connected to the sensing pad control circuitry 55 by connector 56. The sensing pad control circuitry 55 may monitor the sensing circuitry 31 for input data and other information (i.e., movements or the position of a foot motion indicators in proximity to, or in contact with, the sensing circuitry 31) and provide such data and information to the computer system 3 through connector 67.

A plurality of input actuators, such as buttons 40, may also be partially secured within the sensing pad housing 35. As shown in FIG. 2, the upper surface of the input buttons 40 may protrude a nominal distance from the upper surface of the sensing pad housing 35 such that the input buttons 40 may be physically detected by the computer operator 1. The input buttons 40 may be operated and may be programmed to perform and function similar to the buttons of a conventional manually operated mouse or trackball (e.g., to provide "click" action). The input buttons 40 may be operably connected to the sensing pad control circuitry 55 through connector 42. Alternatively, the input buttons 40 may be operably connected directly to the computer system 3.

As shown in FIG. 3, the angle at which the sensing pad housing 35 and the sensing pad 30 are oriented relative to the sensing pad support assembly 25 may be determined and controlled by the angle adjusting assembly 45. The angle adjusting assembly 45 may be operably secured to the upper surface section 26 of the sensing pad support assembly 25 and to the lower surface of the sensing pad housing 35. The angle adjusting assembly 45 may be comprised of conventional mechanical apparatus, which may be adjusted manually by the computer operator 1. Alternatively, as shown in FIG. 3, the angle adjusting assembly 45 may be an electromechanical or a pneumatic apparatus. In these embodiments, the angle adjusting assembly 45 may be adjusted manually by the computer operator 1, or through commands entered into the computer system 3 by the computer operator 1 via the keyboard 13, the mouse 15 or the foot operated input device 20 itself. The commands entered into the computer system 3 via these devices, may be sent to the angle adjusting assembly 45 by the computer system 3 through connector 65. Connector 65 may also provide power to the angle adjusting assembly 45.

In operation, a computer operator 1 may position the foot operated device 20 beneath the desk top 7, as shown in FIG. 1. Next, the computer operator 1 may adjust the angle at which the sensing pad housing 35 and sensing pad 30 are oriented relative to the sensing pad support assembly 25. The computer operator 1 may adjust this angle of the support assembly such that a foot motion indicator under the computer operator's control may be relatively easily and comfortably moved to any location on or above the entire sensing circuitry 31.

The computer operator 1 may input data and other information (e.g., computer screen cursor position information) into the computer system 3 via the foot operated input device 20 without removing his or her hands from the keyboard 15 and without diverting his or her gaze or attention from the keyboard 15 or the computer screen 17. To input data and other information, the computer operator 1 may simply move the foot motion indicator relative to the sensing circuitry 31. Depending upon the type of sensing pad 30 (e.g., capacitive-based, resistive-based or optical-based), the computer operator's foot or foot motion indicator under his or her control may be in contact with, or positioned slightly above (in proximity to), the sensing circuitry 31. The sensing circuitry 31 may sense the relative location or position of the foot motion indicator to the sensing circuitry 31 and translate this information into information for the computer system 3. Additionally, the input buttons 40 may be programmed to function in the same or similar manner to the buttons of a conventional manual pointing device (e.g., as screen item selectors).

Second Embodiment

Figure 4:
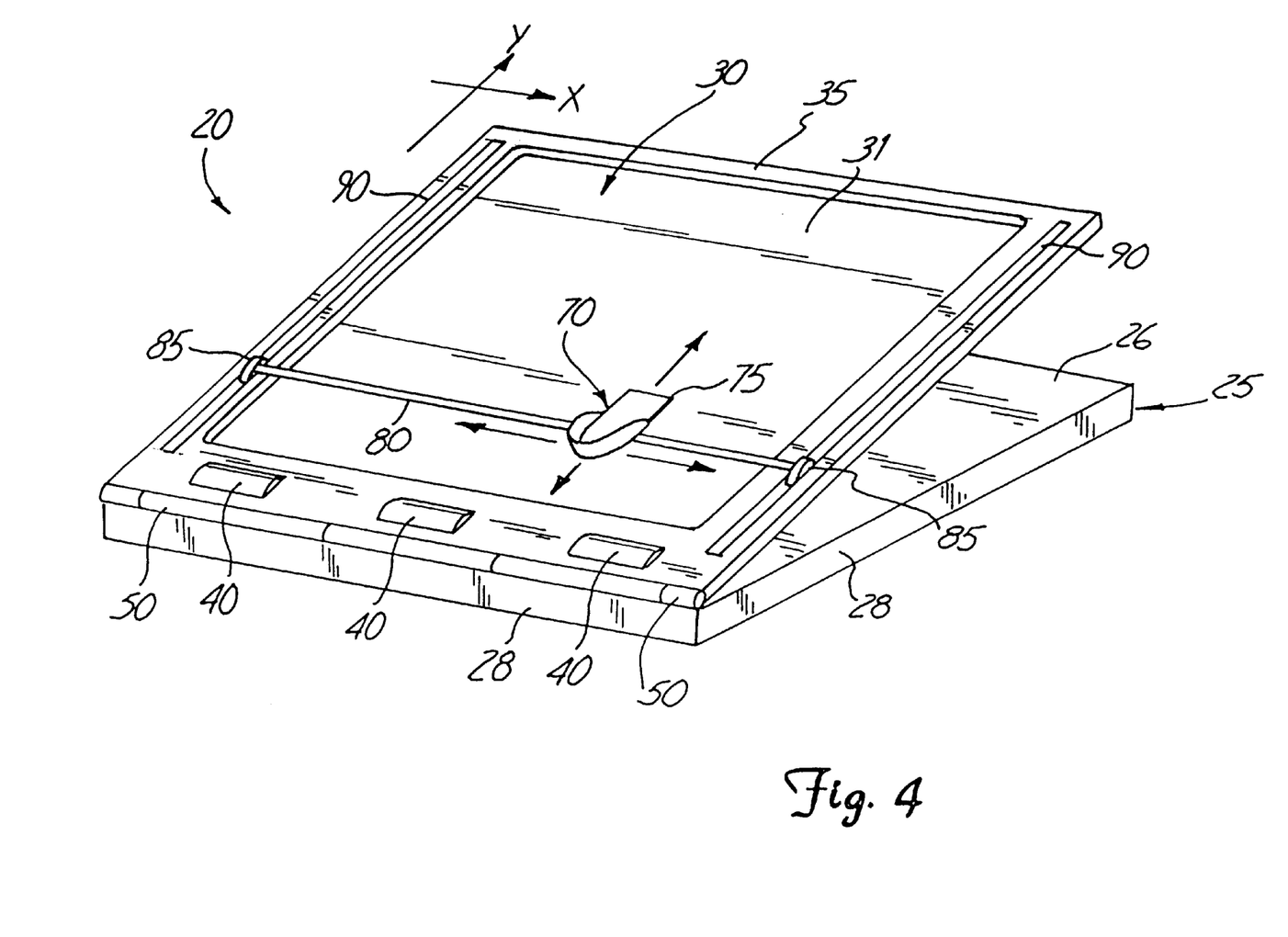
FIG. 4 is a perspective view of an embodiment of the present invention.

An alternative embodiment of the present invention is shown in FIG. 4. In FIG. 4, there is shown the foot operated device 20 of the first embodiment further comprising a foot transport assembly 70. Generally, the foot transport assembly 70 comprises at least one traveling rail 90 (two traveling rails 90 are shown in FIG. 4), a traveler 80 and a platform 75.

The traveling rails 90 may be a groove or slot integrally formed within or upon the sensing pad housing 35 or, alternatively, may be rail or track mounted upon the sensing pad housing 35. In the embodiment shown in FIG. 4, the traveling rails 90 are located on opposing sides of the sensing circuitry 31 and are generally oriented in parallel with the Y axis. The traveling rails 90 may, however, be generally oriented in parallel with the X axis. As shown in FIG. 4, the length of the traveling rails 90 (measured in the direction in which the traveling rail 90 is oriented) may be at least nominally greater than the length of the sensing circuitry 31 (if the traveling rails 90 are oriented in parallel with the Y axis) or the width of the sensing circuitry 31 (if the traveling rails 90 are oriented in parallel with the X axis).

As shown in FIG. 4, slidably connected to the traveling rails 90 is a traveler 80. The traveler 80 may be oriented such that it is substantially perpendicular to the traveling rails 90. The traveler may be oriented such that it is generally parallel to the X axis or Y axis (depending upon the orientation of the traveling rails 90). The length of the traveler 80 (measured in the direction in which the traveler 80 is oriented) may be at least nominally greater than the length of the sensing circuitry 31 (if the traveler 80 is oriented in parallel with the Y axis) or the width of the sensing circuitry 31 (if the traveler 80 is oriented in parallel with the X axis).

The traveler 80 may be slidably connected to the traveling rails 90 by a pair of opposing wheels or ball bearing assemblies 85. The wheels or ball bearing assemblies 85 may be operably mounted to the traveler 80 and operably engaged by the traveling rails 90 such that the computer operator may slide the traveler 80 along the entire length of the sensing circuitry 31 (measured in the Y direction). Slidably mounted upon the traveler 80 is a platform 75. The platform 75 may be mounted upon the traveler 80 by conventional wheel or ball bearing assemblies (not shown) such that the computer operator may slide the platform 75 along the entire length of the traveler 80 and, therefore, the width of the sensing circuitry 31. In this manner, the platform 75 may be positioned on or above the entire sensing circuitry 31.

As shown in FIGS. 5A–D, the platform 75 may be formed in a variety of shapes to receive a foot motion indicator under the control of the computer operator 1. Additionally, the platform 75 itself comprises a foot motion indicator. In operation, the computer operator 1 may place his or her foot in or on the platform 75. The computer operator 1 may then cause the platform 75 to travel along the traveler 80 in a direction parallel to the X axis, or cause the platform 75 and the traveler 80 to travel along the traveling rails 90 in a direction parallel to the Y axis. In this manner the platform 75 may traverse or cover the entire sensing pad 30.

The foot transport assembly 70 may perform several functions. In some cases, a particular foot motion indicator in contact with the sensing circuitry 31 may frictionally engage the sensing circuitry 31 to such an extent that the foot motion indicator may be difficult to move or position relative to the sensing circuitry 31. In these cases, the wheel or ball bearing assemblies of the foot transport assembly 70 may allow the computer operator 1 to move a foot motion indicator relative to the sensing pad 30 with relatively greater ease.

In some other cases, a computer operator 1 may find it difficult to keep a foot-related object in relatively constant proximity to, or relatively constant contact with, the sensing circuitry 31 (e.g., when "dragging" a screen item from one screen position to another), thereby affecting the accuracy of the device. In these cases, the structure of the foot transport assembly 70 may allow the platform 75 to travel over the entire sensing circuitry 31 at a relatively constant distance above, or in a relatively constant contact with, the sensing circuitry 31. Thus, any problems relating to the accuracy of the device may be diminished in these cases.

Figure 5A:
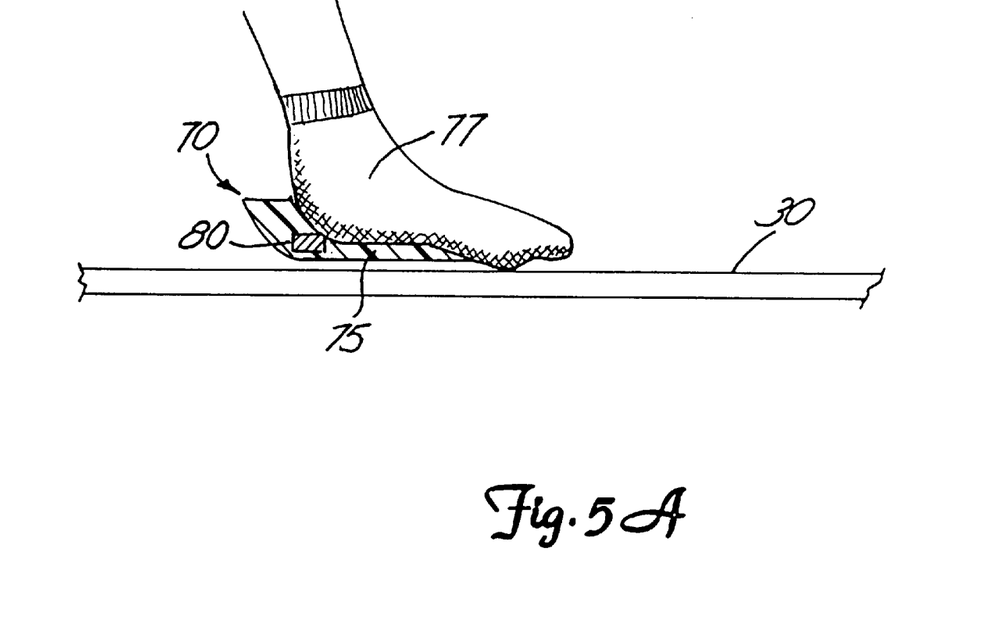
FIGS. 5A–D are side views of the foot transport assembly shown in FIG. 4.

In still other cases, some types of sensing pads 30 may require the foot motion indicator to be relatively conductive in nature. Generally, a computer operator's naked foot may be of the requisite conductive nature to be sensed or detected by these types of sensing pads. However, for a variety of reasons, a computer operator 1 may find it undesirable to remove his or her footwear (such as shoes or socks which are usually non-conductive) while operating the foot operated input device 20. In these instances, as shown in FIG. 5A, the computer operator may wear a conductive covering 77 over the computer operator's normal footwear or over the computer operator's foot. Depending upon the position of the computer operator's foot on the platform 75, the conductive covering 77 may contact or be in relative proximity to the sensing pad 30 such that the conductive covering 77 may be sensed by the sensing pad 30. (This conductive covering 77 may also be used without the foot transport assembly).

Figure 5B:
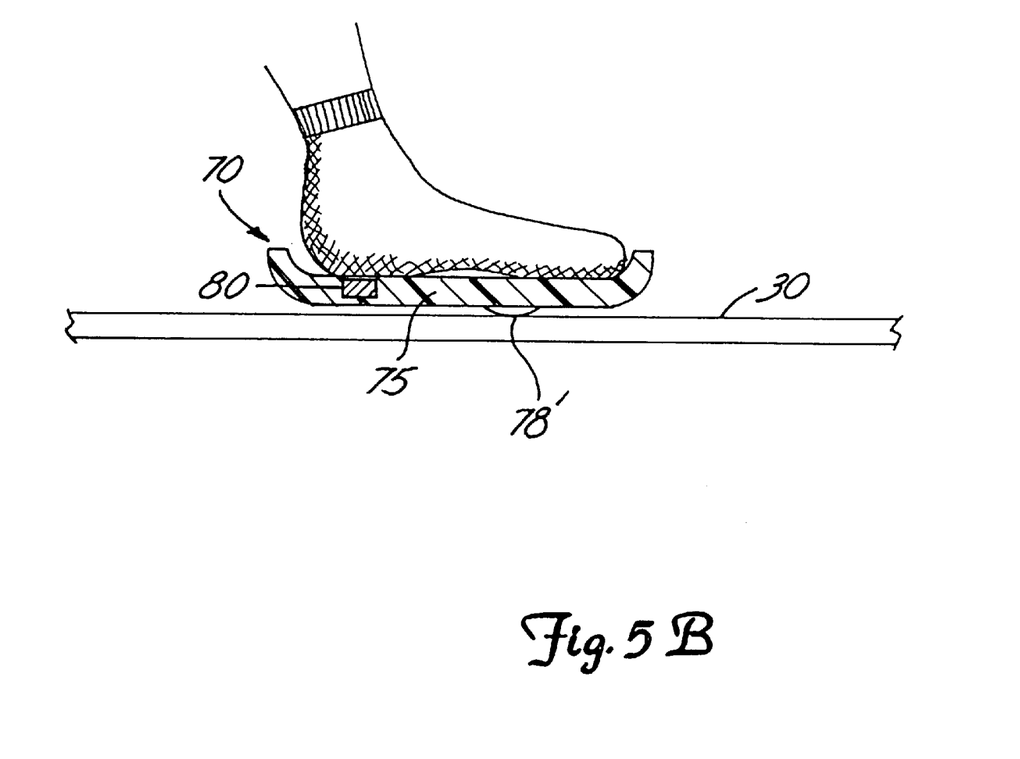
Figure 5C:
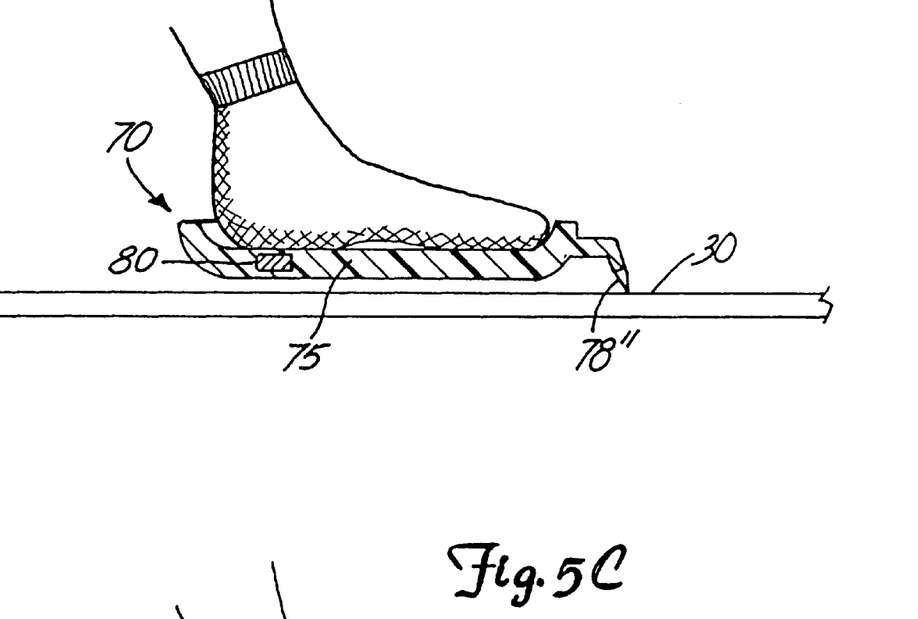
Figure 5D:
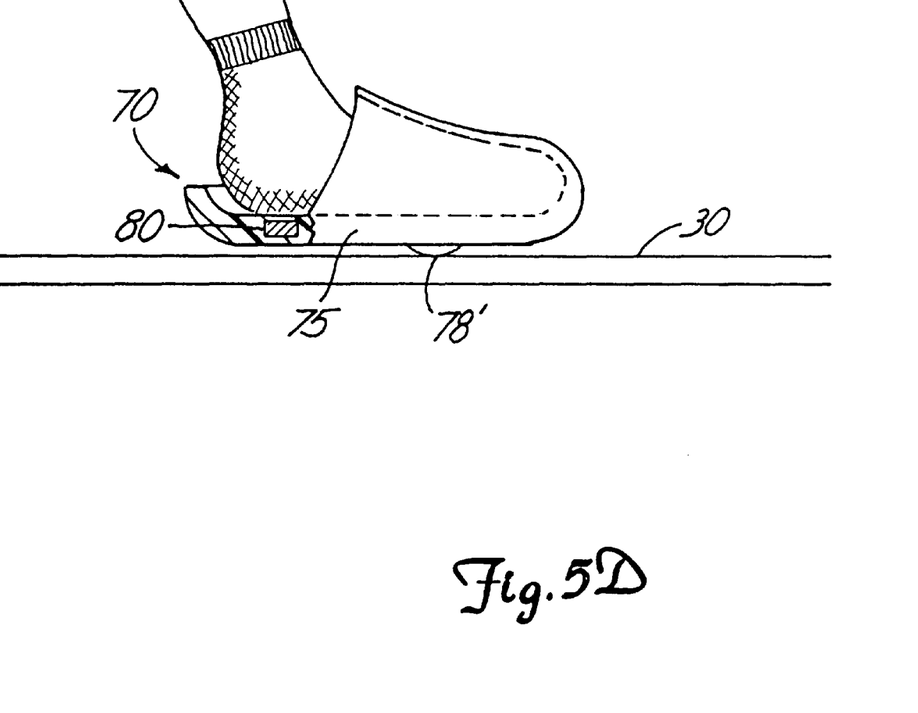

Alternatively, as shown in FIGS. 5B–D, the computer operator 1 may place his or her foot (with or without footwear) into or onto a platform 75 comprising a conductive element 78. The conductive element 78 may be any of a variety of shapes (including the downward facing half-sphere 78' shown in FIGS. 5B and 5D or the pointed element 78" of FIG. 5C) and may be integrally formed with the platform 75 such that it is positioned in contact with, or in relative proximity to, the sensing pad 30. Thus, the foot transport assembly 70 may allow the computer operator 1 to position certain types of foot motion indicators (e.g., foot motion indicators with varying conductivity and shapes) relative to the sensing pad 30.

Third Embodiment

Figure 6:
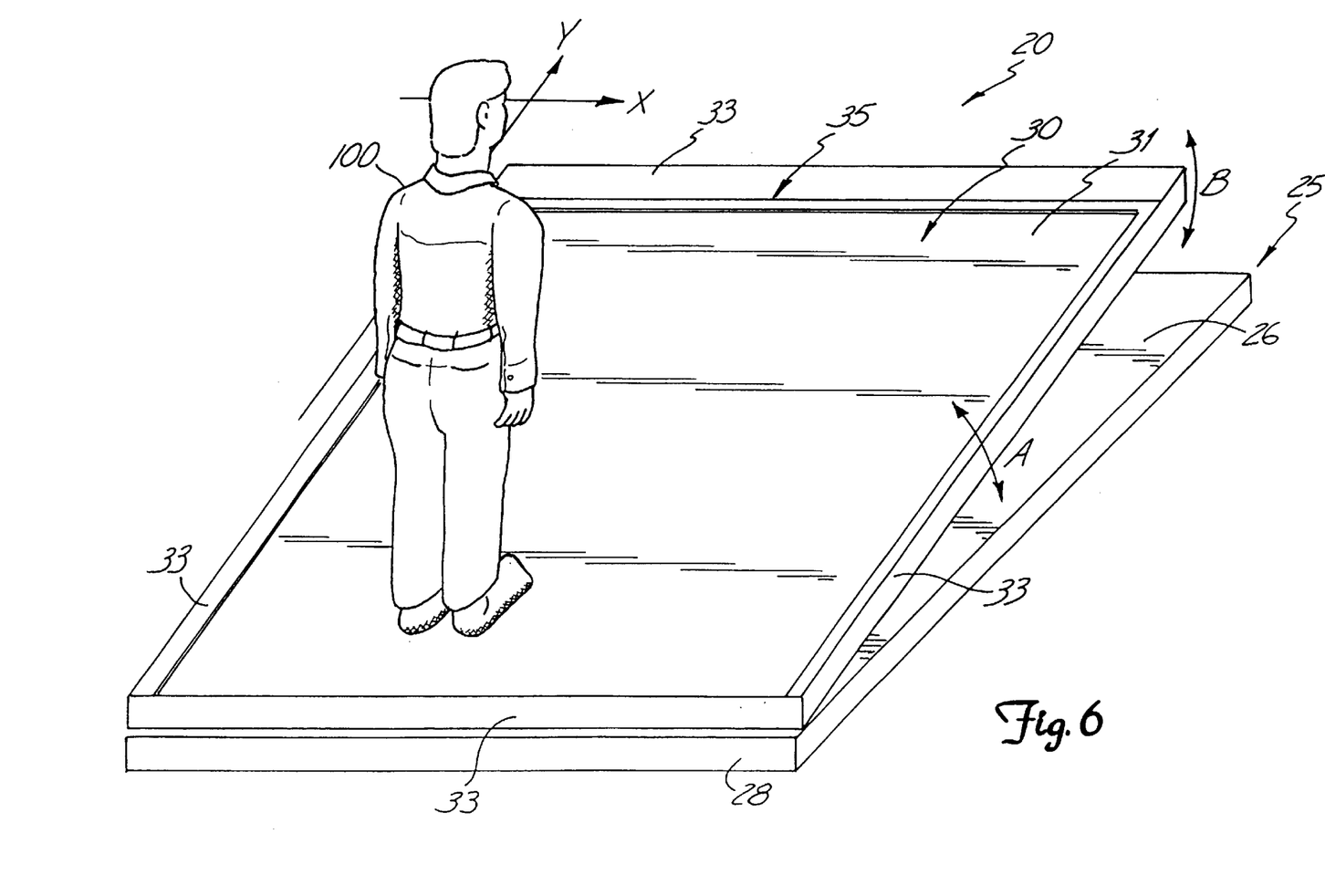
FIG. 6 is a perspective view of yet another embodiment of the present invention.
Figure 7:
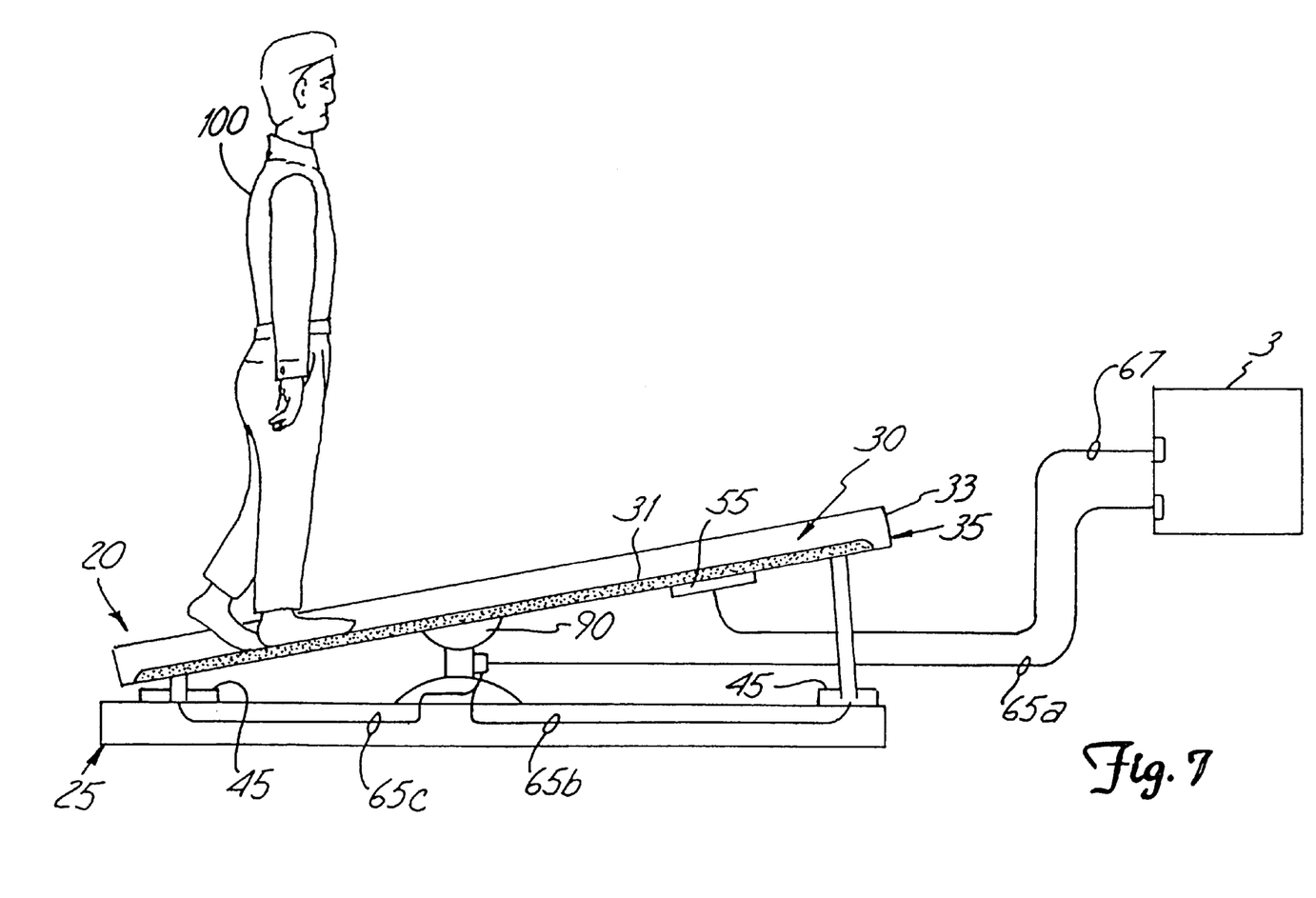
FIG. 7 is a side view of the embodiment of the present invention shown in FIG. 6.

Yet another embodiment of the present invention is shown in FIGS. 6 and 7. In FIGS. 6 and 7, there is shown an embodiment of the present invention wherein the operator 100 may input data or other information while standing upright supported on and generally on top of the exposed area of the sensing pad 30. Additionally, the sensing pad 30 may be continuously variably oriented in a variety of angles relative to the sensing pad support assembly 25 and to both the X and Y axes as shown by arrows A and B. This embodiment may be used with certain virtual reality environments, where relatively larger movements of the body may be desirable when inputting information into the computer system 3 or other electronic system.

The exposed area of the sensing pad 30 of this embodiment may be dimension such that the operator 100 may stand upon and move both feet relatively freely about the exposed area of the sensing pad 30. In the embodiment shown in FIG. 6, the exposed area of the sensing pad may be approximately 55 inches wide and 55 inches long. Additionally, the sensing pad housing 35 may comprise a guard rail 33 around the perimeter of the sensing pad housing 30 that operates to inform the operator 100 of the outer edges of the device.

As shown in FIG. 7, the sensing pad 30 and sensing pad housing 33 may be operably attached to the sensing pad support assembly 25 by a plurality of angle adjustment assemblies 45 and a pivot assembly 90. In this embodiment, commands sent by the computer system 3 (or any other electronic system) to the plurality of angle adjustment assemblies 45 and a pivot assembly 90 via connectors 65*a*–*c* may control the orientation of the sensing pad housing 35 and sensing pad 30 relative to both the X and Y axes (i.e., relative to the sensing pad support assembly 25). This variable orientation of the sensing pad housing 35 and sensing pad 30 relative to the X and Y axes may enhance certain virtual reality games.

In particular, with this embodiment, the sensing pad 30 may be configured such that position and motion information may be sensed, roughly contemporaneously, at two positions; one for each foot supported on the sensing pad 30. Thus, the sensing pad of this embodiment can provide additional input information that may be used in applications where foot motion and position from both feet is of interest or use. The sensor pad could also be weight sensitive to provide information on the balance of the supported person.

Figure 8:
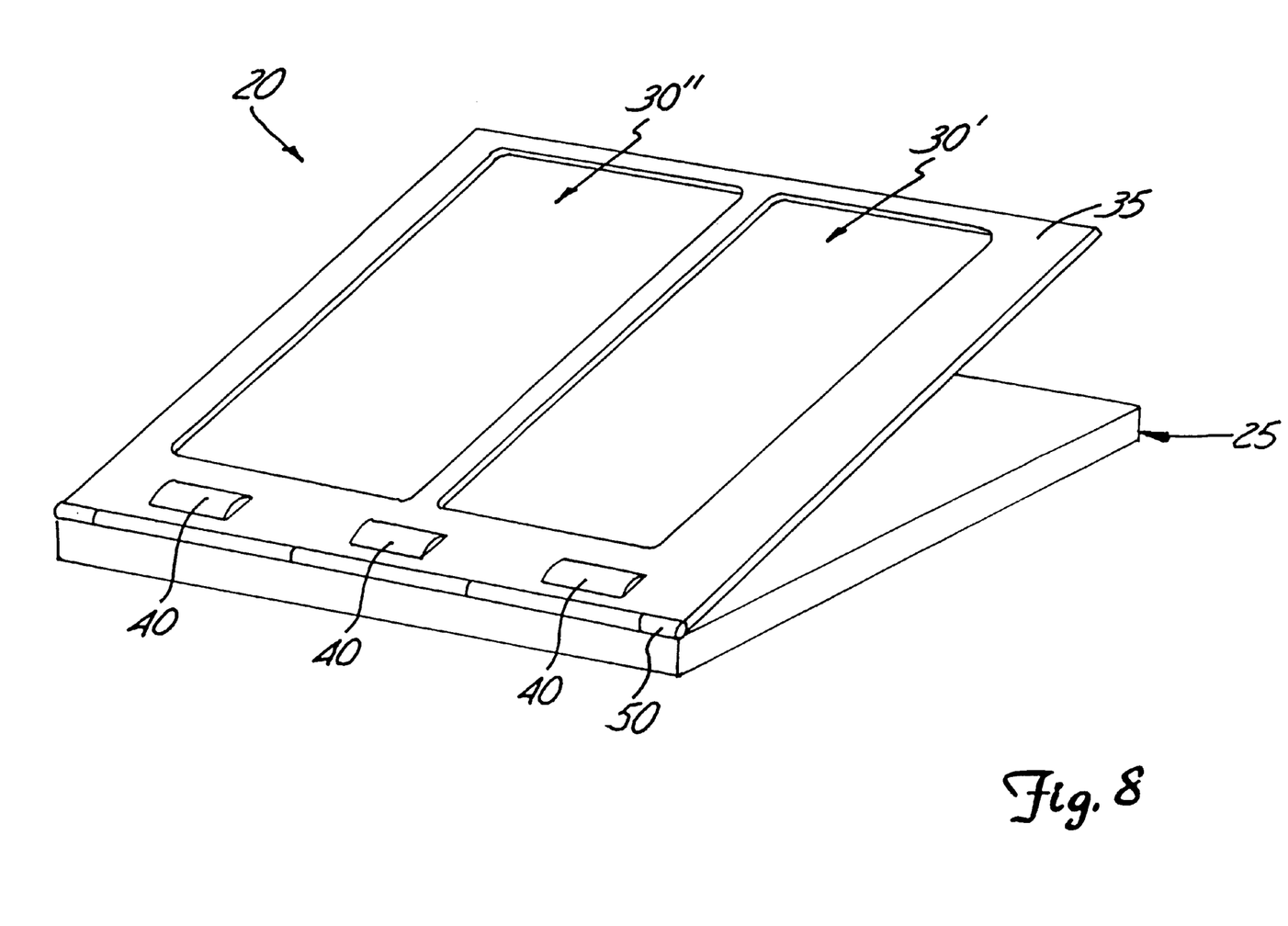
FIG. 8 is a perspective view of yet another embodiment of the present invention.

From the foregoing description, it will be apparent that modifications can be made to the foot operated input device and method for using same without departing from the teachings of the present invention. For example, as shown in FIG. 8, the foot operated device 20 may comprise a plurality of sensing pads 30' and 30" each receiving one foot motion indicator and each providing pointing and selection capabilities. Accordingly, the scope of the invention is only limited as necessitated by the accompanying claims.

What is claimed is:

1. A method for inputting information into an electronic device comprising:

providing a sensing pad;

positioning a support assembly which is connected to the sensing pad in one of a plurality of positions so as to adjust the orientation of the sensing pad relative to the electronic device operator;

sensing in the sensing pad the location relative to the sensing pad of a contact element which is connected to a foot motion indicator that is positioned adjacent to and in a substantially fixed location with respect to a foot, and wherein the contact element and the foot motion indicator are moveable to a plurality of positions relative to the sensing pad and are controlled by the operator; and translating the location of the contact element into electronic information for the electronic device.

2. The method of claim 1 further comprising displaying the electronic information on a screen.

3. The method of claim 1 wherein the act of sensing comprises capacitive sensing.

4. The method of claim 1 wherein the act of sensing comprises resistive sensing.

5. The method of claim 1 wherein the act of sensing comprises optical sensing.

6. The method of claim 1 wherein the act of sensing comprises proximity sensing.

7. The method of claim 1 wherein the act of sensing comprises touch sensing.

8. The method of claim 1 further comprising the act of orienting a second sensing pad relative to the electronic device operator.

9. The method of claim 1, wherein the contact element is electrically conductive.

10. The method of claim 1, wherein the contact element comprises a downward facing half-sphere.

11. The method of claim 1, wherein the contact element comprises a substantially pointed portion which contacts a surface of the sensing pad.

12. The method of claim 1, wherein the act of positioning the support assembly comprises adjusting the angular orientation between a surface of the sensing pad and a plane upon which a base portion of the support assembly is positioned.

13. A method for inputting information into a digital computer, wherein the digital computer comprises a digital computer screen, the method comprising:

positioning a support assembly in one of a plurality of positions so as to adjust the orientation of a sensing pad connected thereto relative to an operator of the digital computer;

sensing in the sensing pad the location relative to the sensing pad of a foot motion indicator that is positioned adjacent to and in a substantially fixed location with respect to a foot, and that is moveable to a plurality of positions relative to the sensing pad;

translating the location of the foot motion indicator into computer screen information; and displaying the computer screen information.

14. The method of claim 13 wherein the act of sensing comprises capacitive sensing.

15. The method of claim 13 wherein the act of sensing comprises resistive sensing.

16. The method of claim 13 wherein the act of sensing comprises optical sensing.

17. The method of claim 13 wherein the act of sensing comprises proximity sensing.

18. The method of claim 13 wherein the act of sensing comprises touch sensing.

19. The method of claim 13 wherein the act of positioning the support assembly comprises adjusting the angular orientation between a surface of the sensing pad and a plane upon which a base portion of the support assembly is positioned.

20. A method for inputting information into an electronic device comprising:

positioning the support assembly in one of a plurality of positions so as to adjust the orientation of the sensing pad relative to an electronic device operator;

providing a sensing pad having a support assembly connected thereto;

providing a foot motion indicator that is positioned adjacent to and in a substantially fixed location with respect to a foot, and that is moveable to a plurality of locations relative to the sensing pad;

positioning the foot motion indicator relative to the sensing pad;

sensing in the sensing pad the position of the foot motion indicator relative to the sensing pad;

translating the position of the foot motion indicator relative to the sensing pad into electronic information; and providing the electronic information to the electronic device.

21. The method of claim 20 wherein the act of sensing comprises capacitive sensing.

22. The method of claim 20 wherein the act of sensing comprises resistive sensing.

23. The method of claim 20 wherein the act of sensing comprises optical sensing.

24. The method of claim 20 wherein the act of sensing comprises proximity sensing.

25. The method of claim 20 wherein the act of sensing comprises touch sensing.

26. The method of claim 20 wherein the act of translating comprises digitally translating the position of the foot motion indicator relative to the sensing pad into electronic information.

27. The method of claim 20 wherein the act of positioning comprises mechanically positioning the foot motion indicator relative to a sensing pad.

28. The method of claim 20 further comprising the acts of:

(a) providing a second foot motion indicator; and (b) sensing the position of the second foot motion indicator relative to a second sensing pad.

29. The method of claim 20 further comprising inputting information into the electronic device with an actuator.

30. The method of claim 20 wherein the act of positioning the support assembly comprises adjusting the angular orientation between a surface of the sensing pad and a plane upon which a base portion of the support assembly is positioned.

* * * * *